United States Patent [19]

Holler et al.

[11] Patent Number: 5,075,869

[45] Date of Patent: Dec. 24, 1991

[54] NEURAL NETWORK EXHIBITING IMPROVED TOLERANCE TO TEMPERATURE AND POWER SUPPLY VARIATIONS

[75] Inventors: Mark A. Holler, Palo; Hernan A. Castro, Shingle Spring; Simon M. Tam, Redwwod City, all of Calif.

[73] Assignee: Intel Corporation, Santa Clara, Calif.

[21] Appl. No.: 557,555

[22] Filed: Jun. 24, 1990

[51] Int. Cl.⁵ .............................................. G06F 15/18
[52] U.S. Cl. .................................................... 395/24
[58] Field of Search ..................... 364/513; 307/201; 371/21.1, 21.4

[56] References Cited

U.S. PATENT DOCUMENTS 4,904,881  2/1990  Castro .................................. 307/201
4,950,917  8/1990  Holler et al. ........................ 307/201
4,999,525  3/1991  Park et al. ............................ 307/201

Primary Examiner—Allen R. MacDonald
Attorney, Agent, or Firm—Blakely, Sokoloff, Taylor & Zafman

[57] ABSTRACT

An analog neural network is described which provides a means for reducing the sensitivity of the network to temperature and power supply variations. A first circuit is utilized for generating a signal which exhibits a dependence on temperature corresponding to the variation normally experienced by the network in response to a change in temperature. A second circuit is employed to generate another signal which exhibits a similar dependence, except on power supply variations. By coupling these signals as inputs to the neural network the sensitivity of the network to temperature and power supply fluctuations is essentially nulified.

10 Claims, 4 Drawing Sheets

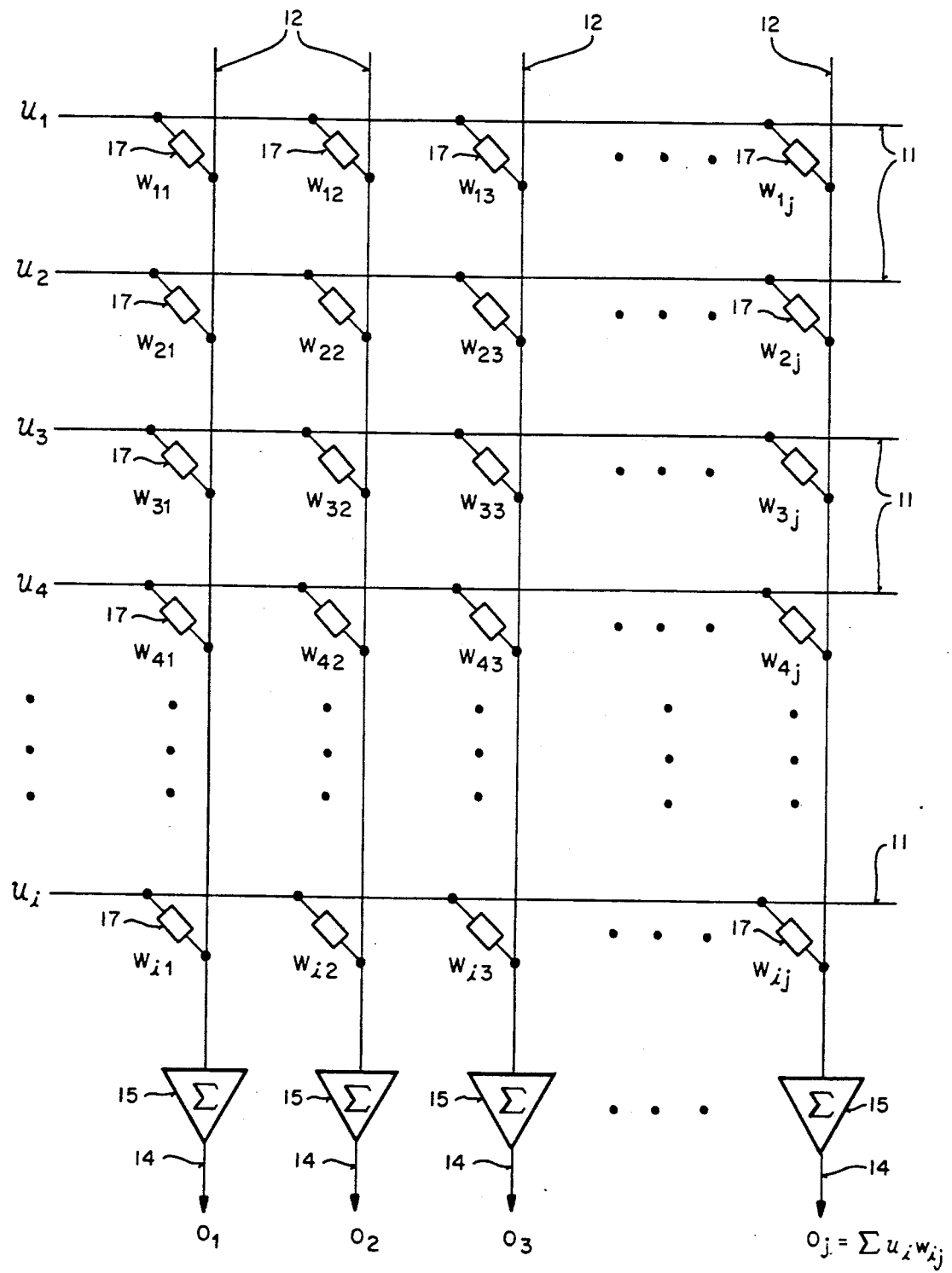
FIG_1 (PRIOR ART)

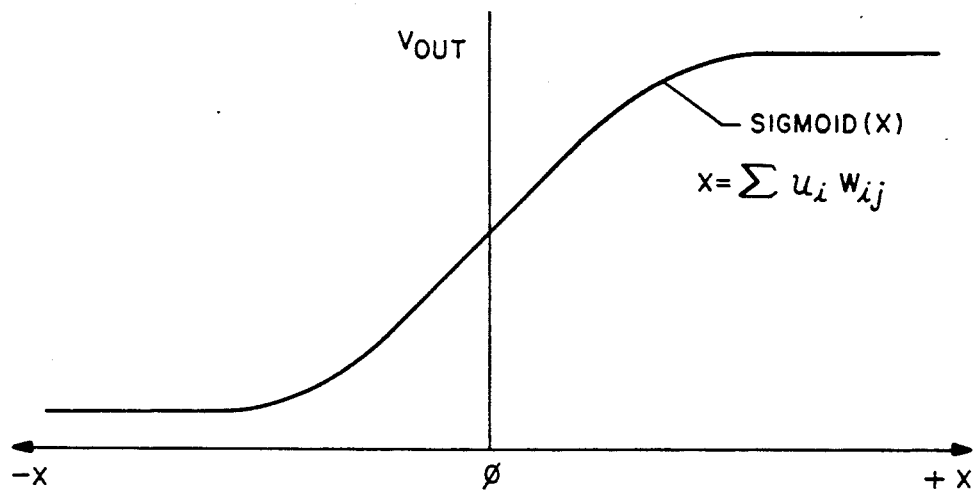
FIG_2
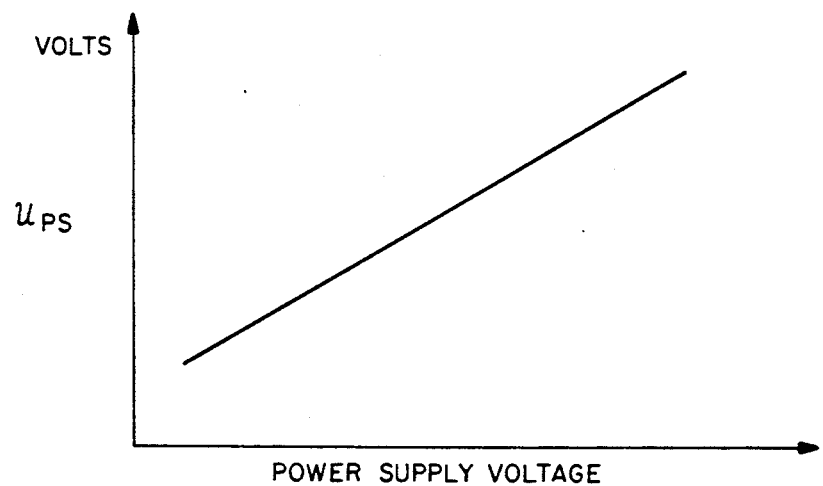
FIG_4A
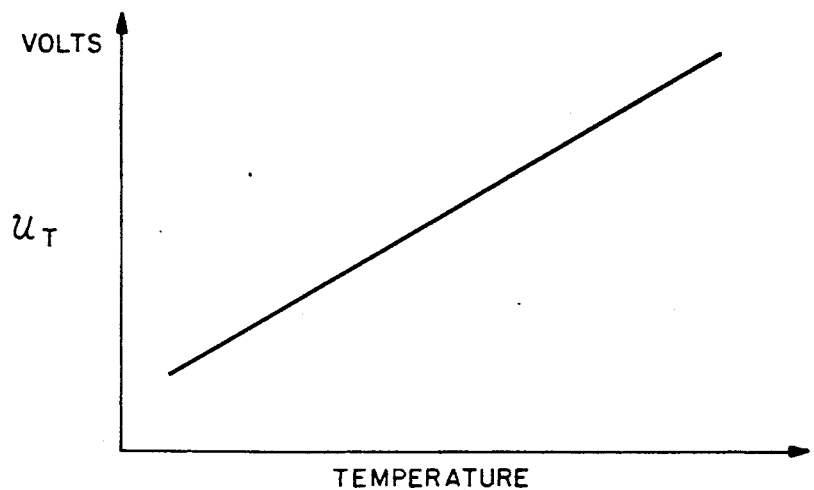
FIG_4B

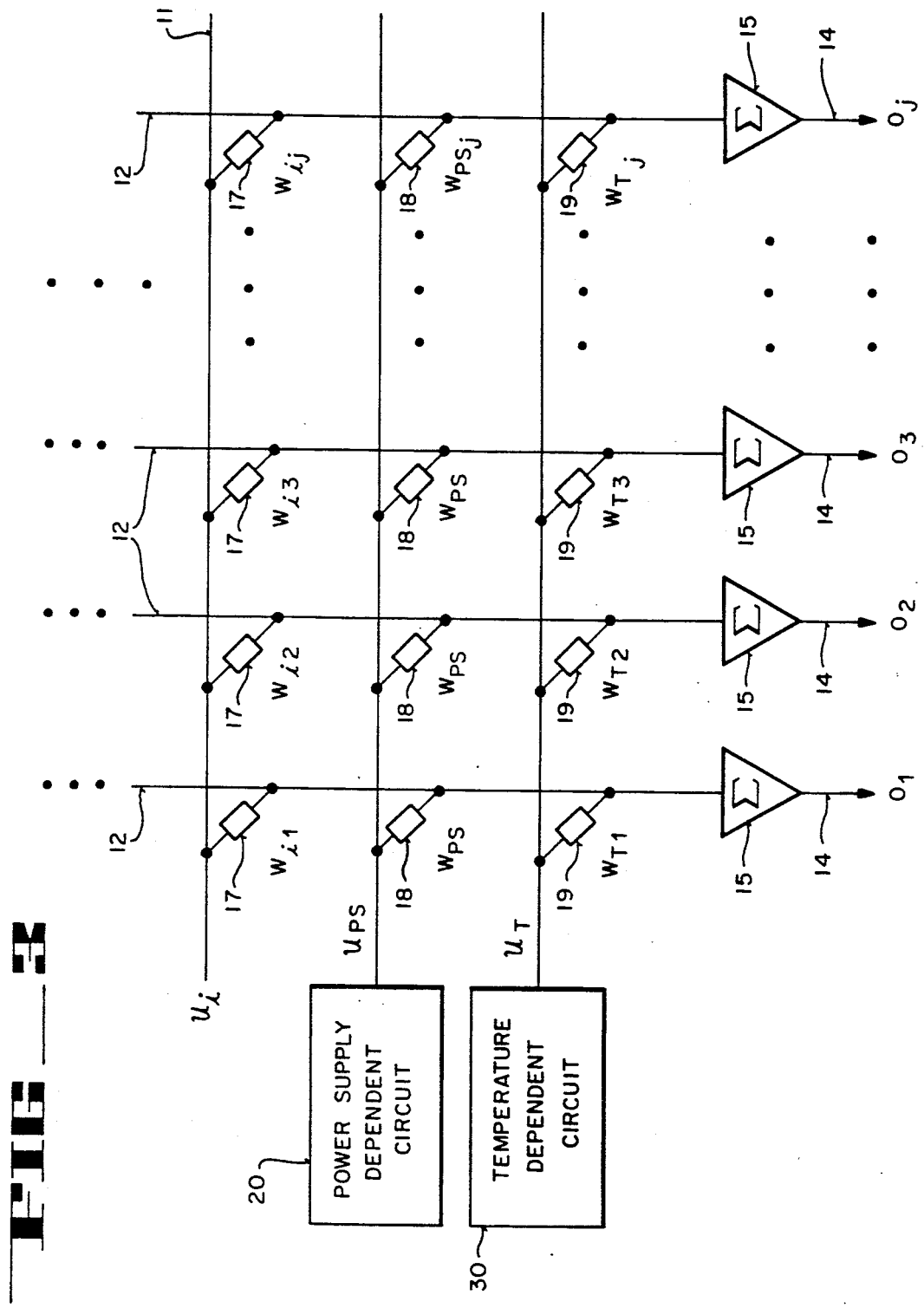

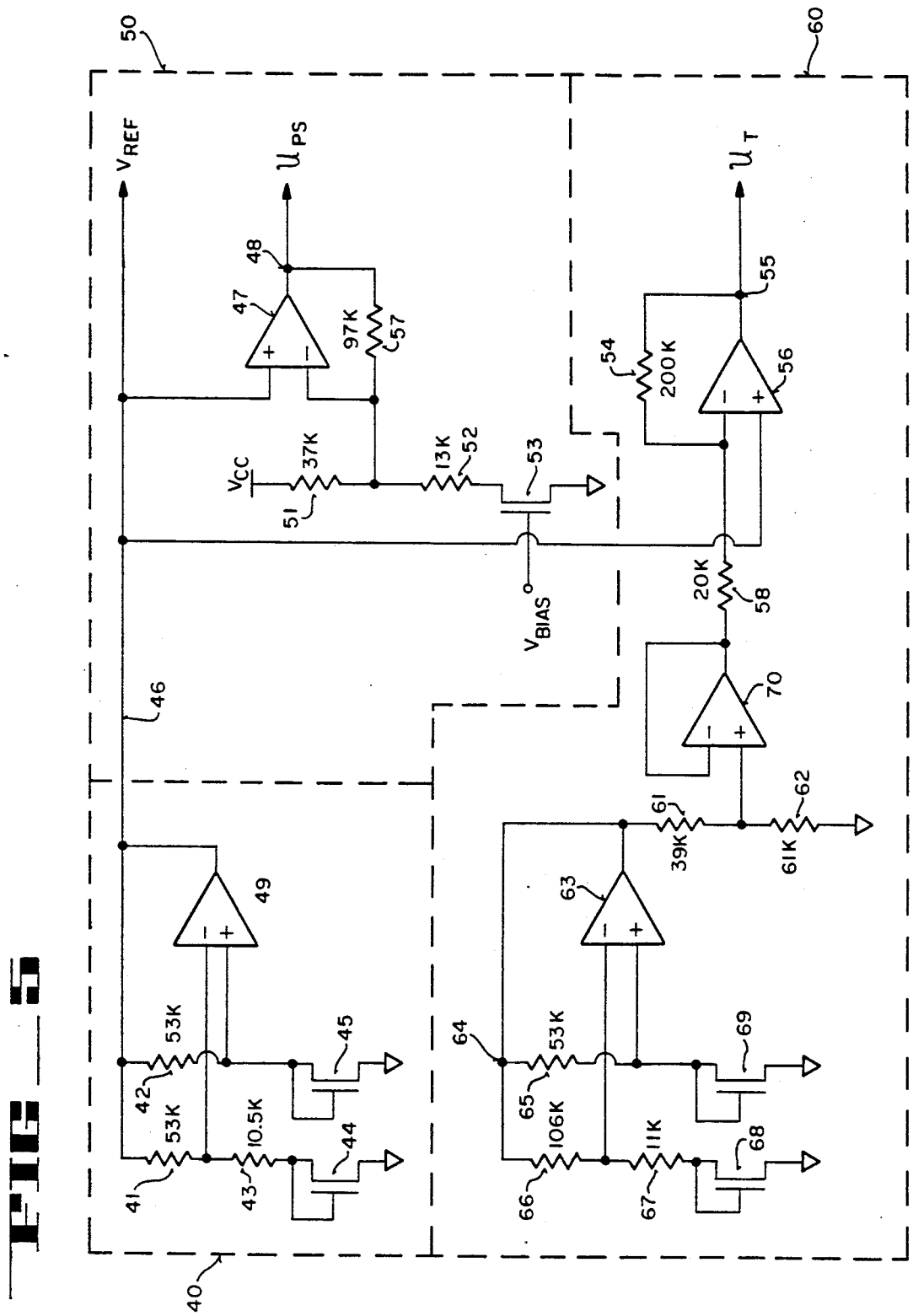
FIG_5

NEURAL NETWORK EXHIBITING IMPROVED TOLERANCE TO TEMPERATURE AND POWER SUPPLY VARIATIONS

FIELD OF THE INVENTION

The invention pertains to the field of associative networks for emulating higher-order functions performed in the cortex of the human brain.

BACKGROUND OF THE INVENTION

Neural networks are a class of electronic circuits which emulate higher-order brain functions such as memory, learning and/or perception/recognition. Associative networks are one category of neural devices which sense an input event and output a pattern of signals identifying that event.

Associative networks generally take the form of a matrix comprising a set of horizontal lines which cross and contact a set of vertical lines. The horizontal lines simulate the function of axons in the cortex of the brain and are used as inputs. The vertical lines simulate the function of dendrites extending from neurons. Each vertical line terminates at a voltage summing device which acts to simulate the function of the neuron cell body. Examples of such associative networks are found in pending applications entitled; "Semiconductor Cell For Neural Network Employing A Four-Quadrant Multiplier", Ser. No. 283,553, filed 12/09/88; "EXCLUSIVE-OR Cell For Neural Network And The Like", Ser. No. 309,247, filed 02/10/89; and "Neural Network Employing Leveled Summing Scheme With Blocked Array", Ser. No. 357,411, filed 05/26/89, now U.S. Pat. Nos. 4,950,917; 4,904,881; and 5,040,134 respectively, all of which are assigned to the assignee of the present application.

Within an associative network, neural synapses are simulated by circuit cells which provide electrical connection between the horizontal and vertical lines of the network. Individual synapses provide a weighted electrical connection between an input and a voltage summing element, i.e., a neuron. These synapse cells may either be analog or digital in nature. Analog circuitry is often preferred over digital circuitry for neural networks because of its superior density and also because neural networks generally do not require very high precision.

For an analog implementation, the weighted sum of input signals is usually computed by summing analog currents or charge packets. Examples of circuit devices useful as synapse cells in neural network are described in the co-pending applications entitled, "Adaptive Synapse Cell Providing Both Excitatory And Inhibitory Connections In An Associative Network", Ser. No. 379,933, filed 07/13/89; and "Improved Synapse Cell Employing Dual Gate Transistor Structure", Ser. No. 419,685, filed 10/11/89 now U.S. Pat. Nos. 4,956,564 and 4,961,002 respectively.

One of the major drawbacks associated with analog neural networks is that they are subject to inaccuracies resulting from external variations; mainly temperature and power supply variations. The dependence of the network on power supply and temperature variations introduces small error or offset terms into the calculations being performed. A typical network cycles through a series of weight changes until the entire network converges to a certain pattern, which depends on the pattern of inputs applied. The presence of error terms interferes with this learning process, ultimately leading to slower convergence times. Therefore, what is needed is a means for reducing an analog neural network's sensitivity to power supply and temperature variations.

As will be seen, the present invention greatly increases the computation accuracy of an analog neural network by increasing the network's tolerance to temperature and power supply variations.

SUMMARY OF THE INVENTION

An analog associative network is described which includes a plurality of synapse cells providing a weighted connection between a plurality of inputs and a plurality of neural summing devices. The neural summing devices collectively generate a sum-of-products between an input pattern and the weights stored within the synapse cells. The present improvement provides a means for reducing the sensitivity of an analog associative network to temperature and power supply variations.

In one embodiment of the present invention, a first circuit means is utilized for generating a first compensating signal along a first input line coupled to the network. This first signal exhibits a dependence on temperature corresponding to the variation normally experienced by the network in response to a change in temperature. The invention further includes a means for setting the weights associated with the synapse cells coupling the first input line to the neural summing devices such that the sensitivity of said network to temperature fluctuations is essentially nullified.

The same technique is also used to give the associative network a greater tolerance to changes in power supply voltage. That is, a second circuit means is included for generating a second compensating signal input along a second input line coupled to said network. This second signal similarly exhibits a dependence on power supply voltage corresponding to the variation normally experienced by the network in response to a change in power supply. A means for setting the weights associated with the synapse cells which provide connection between said second signal and said neural summing devices is also included.

Thus, the sensitivity of the neural network to temperature and power supply variations is markedly reduced by the present invention.

BRIEF DESCRIPTION OF THE DRAWINGS

The novel features believed characteristic of the invention are set forth in the appended claims. The invention itself however, as well as other features and advantages thereof, will be best understood by reference to the description which follows, read in conjunction with the accompanying drawings, wherein:

FIG. 1 illustrates a typical prior art neural network.

FIG. 2 is a graph of the ideal neural function generated by the network of FIG. 1.

FIG. 3 illustrates the currently preferred embodiment of the present invention in which the basic neural network further includes power supply and temperature compensating inputs.

FIG. 4A is a graph showing, by way of example, the relationship between the power supply compensating input and power supply voltage for a given embodiment of the present invention.

FIG. 4B is a graph showing, by way of example, the relationship between the temperature compensating input and temperature for a given embodiment of the present invention.

FIG. 5 illustrates the currently preferred embodiment of the power supply and temperature dependent circuits of the present invention.

DESCRIPTION OF THE PREFERRED EMBODIMENT(S)

Referring to FIG. 1, a schematic of a prior art neural network is illustrated. Input patterns (e.g., stimuli) to the network are applied collectively along lines 11, labelled $u_1$–$u_i$, in the form of input voltages. Depending on the pattern of inputs applied, the network of FIG. 1 will cycle through a series of weight changes until the entire network converges to a certain solution (i.e., a certain pattern).

The associative network of FIG. 1 also includes a plurality of synapse cells 17, labelled as $W_{ij}$, where i and j are integers defining the vertical and horizontal dimensions of the neural matrix. Synapse cells 17 provide a weighted connection between input lines 11 and output summing lines 12. Each of the output summing lines 12 is coupled to the input of a neural summing device 15, which ordinarily comprises an operational amplifier.

Each of the synapse cells 17 function as a sort of analog multiplier; multiplying the input voltage $u_i$ present on line 11 with the stored weight $W_{ij}$, providing the result on output summing line 12 in the form of an output current. Neural summing devices 15 sum the individual current contributions provided by inputs $u_1$–$u_i$ as multiplied by the stored weights in the associated cells 17. From a mathematical standpoint, in an ideal neural network, the outputs provided on lines 14 each represent a sum-of-products (SOP) of the corresponding input components $u_i$ and stored weights $W_{ij}$. This is expressed mathematically by the equation $$O_j = \Sigma u_i W_{ij} \quad (1)$$

where Oj represents the jth output produced by neural summing device 15.

In reality, all analog circuits exhibit some dependency on power supply and temperature which modifies the sum-of-products result expressed by equation (1). For example, analog devices fabricated as part of an integrated circuit generally have characteristics which vary linearly with the applied power supply voltage or ambient environmental temperature. As previously mentioned, in an associative network such temperature and power supply dependencies commonly give rise to offset terms which alter the output levels produced on lines 14.

An ideal neuron function is shown in FIG. 2, where the output is given by the relationship $$\text{Output} = \text{Sigmoid}(x); \quad (2)$$

where $x = \Sigma u_i W_{ij}$.

In other words, the variable x simply represents the dot product of an input vector u and a stored weight vector W. For very large positive values of x, the ideal neuron function is a relatively large positive output potential, which is constant with further increases in x. Similarly, for very large negative values of x the ideal neuron function produced at the output of devices 15 is a relatively small positive output voltage which is constant with decreasing values of x.

For an analog circuit implementation of the ideal neuron function shown in FIG. 2, the added sensitivity due to power supply and temperature variations alters Equation 1 as follows:

$$\text{Output} = \text{Sigmoid}(\Sigma u_i W_{ij})(f(T,PS)) \quad (3)$$

Typically, the dependence on power supply and temperature is linear, so that equation 3 may be rewritten as $$\text{Output} = \text{Sigmoid}((\Sigma u_i W_{ij})(\alpha T)(\beta PS)) \quad (4)$$

$$= \text{Sigmoid}(\Sigma u_i W_{ij} \alpha T \beta(PS)) \quad (5)$$

Usually, the factors $\alpha$ and $\beta$ are relatively small—depending largely on the physics of the material used to fabricate the neural network (e.g., silicon)—to that the term $\alpha\beta T$ (PS) can be neglected. Doing so permits the output to be rewritten as $$\text{Output} \sim \text{Sigmoid}(\Sigma u_i W_{ij} + \alpha T \Sigma u_i W_{ij} + \beta(PS)\Sigma u_i W_{ij}) \quad (6)$$

In general, the sum-of-products described by equation 6 is a linear function of temperature and power supply voltage, e.g., $V_{cc}$. However, it is interesting to note that the extra terms of equation 6—corresponding to the variations or offsets produced by temperature and power supply, respectively—are products themselves. This is significant since the synapse cells are ideally suited for generating such product terms. Taking advantage of this fact the present invention provides additional inputs $u_T$ and $u_{PS}$ which, when multiplied by additional stored weights $W_T$ and $W_{PS}$, act to nulify the additional temperature and power supply terms of equation 6. In practice, weights $W_T$ and $W_{PS}$ are set such that $$u_T W_T = \alpha T \Sigma u_i W_{ij}$$

$$u_{PS} W_{PS} = \beta(PS)\Sigma u_i W_{ij}$$

thereby counteracting the variations or errors introduced as an inherent part of the analog neural network.

Referring to FIG. 3, the currently preferred embodiment of the present invention is shown. The neural network of FIG. 3 includes a plurality of input voltage lines 11, output summing lines 12, synapse cells 17 and output neural summing devices 15. Additionally, the circuit of FIG. 3 includes two inputs $u_{PS}$ and $u_T$ which are provided to the associative network by power supply dependent circuit 20 and temperature dependent circuit 30, respectively. Circuit 20 generates a voltage (i.e., $u_{PS}$) which is sensitive to, and dependent upon, power supply voltage. At the same time circuit 30 generates a voltage (i.e., $u_T$) which exhibits a dependence upon temperature.

Input $u_{PS}$ is coupled to output summing line 12 through the synapse cell 18 which stores a weight Wpsj. This weight is set such that the product use of $u_{PS}$ and Wpsj nullifies the sensitivity of the network to changes in power supply voltage. Likewise, input $u_T$ is coupled to output lines 12 by synapses 19 which store weights $W_{Tj}$. In the same manner as described above, the weight $W_{Tj}$ is set such that the product $u_T W_{Tj}$ counteracts the temperature variations experienced by the network of FIG. 3.

The overall effect of including terms $u_T$ and $u_{PS}$ in the input pattern presented to the neural network is described mathematically by the equation:

$$\text{Output} = \text{Sigmoid}(\Sigma u_i W_{ij} + \alpha T \Sigma u_i W_{ij} + \beta(PS) \Sigma u_i W_{ij} + u_T W_T + u_{PS} W_{PS}) \quad (7)$$

If $W_T$ and $W_{PS}$ are set such that $u_T W_T = \alpha T \Sigma u_i W_{ij}$ and $u_{PS} W_{PS} = \beta(PS) \Sigma u_i W_{ij}$ then the temperature and power supply sensitivities of the neuron will be nullified. Thus, the additional terms generated in the network of FIG. 3 compensate for the variations normally experienced by the analog circuit.

Power supply dependent circuit 20 and temperature dependent circuit 30 comprise ordinary regulator circuits which produce an output voltage dependent upon power supply and temperature, respectively. These circuits may take a variety of forms, easily designed by an ordinary practitioner. For example, circuit 30 may be implemented in a straightforward manner by modifying a standard voltage reference circuit. Likewise, since the power supply voltage $V_{CC}$ is already provided on the same integrated circuit as the network of FIG. 3, it can be level shifted and amplified by circuit 20 to produce the appropriate output voltage dependency. Circuit designers normally have a very good idea of the temperature and power supply sensitivities associated with their devices, so that the task of designing circuits having linear outputs which tracks temperature and power supply is well within the skill of the art.

FIGS. 4A and 4B show, by way of example, a linear relationship between inputs $u_{PS}$ and the power supply voltage, and also input $u_T$ and the device temperature, respectively, for one embodiment of the present invention. Normally, this type of linear input is required to exactly compensate for the effects of temperature and power supply in an analog associative network which exhibits a linear dependence on these factors.

Power supply and temperature dependent circuits 20 and 30 are preferably fabricated on the same integrated circuit as the neural network. In this way both will experience the same environmental conditions as the neural network. Alternatively, circuits 20 and 30 can be fabricated as part of a separate integrated circuit. However, in this case circuits 20 and 30 should be exposed to the same ambient environment as the neural network (e.g., temperature and power supply variations) for greatest accuracy.

An alternative means of establishing the values of $W_T$ and $W_{PS}$ is to train the network using a standard learning algorithm, e.g., such as the back-propagation algorithm. For this method, the input patterns are presented to the network while deliberately varying the power supply voltage and ambient temperature. That is, an input pattern are first applied to the network at one fixed temperature and power supply voltage, and then repeatedly reapplied, each time at a different temperature and power supply voltage.

Since the patterns are presented many times during training, changing the power supply and temperature with each input pattern presentation greatly facilitates the training process. In this way, the same learning algorithm that sets the weights of synapse cells 17 during normal pattern recognition can also be used to set the weights for synapse cells 18 and 19 (i.e., setting the weight parameters associated with power supply and temperature). By training the network using power supply and temperature as components of the input vectors, the network learns that temperature and power supply are not distinguishing features for the input patterns being learned.

Referring now to FIG. 5, there is shown the currently preferred embodiment of the present invention power supply and temperature dependent circuits 20 and 30, respectively. The circuit of FIG. 5 is divided into three distinct sections according to function, as indicated by the dashed lines. Section 40 generates a reference potential along line 46. This reference potential, $V_{ref}$, is relatively insensitive to power supply and temperature variations and is coupled to both of sections 60 and 50. Section 50 corresponds to the power supply dependent circuit 20 of FIG. 3 while section 60 corresponds to temperature dependent circuit 30 also illustrated in FIG. 3.

Basically, operational amplifier 49 drives output line 46 which, in turn, is coupled to one end of resistors 41 and 42. The other ends of resistors 41 and 42 are coupled to the negative and positive input nodes, respectively, of amplifier 49. Therefore, amplifier 49 operates to produce a constant voltage on line 46. Ordinary n-channel field-effect devices 44 and 45 establish quiescent current flow in resistors 41–43. Because resistors 41 and 42 are equal to each other, the reference voltage provided on line 46 is relatively insensitive to changes in power supply or temperature.

Operational amplifier 47 receives the reference voltage provided on line 46 at its positive input. Coupled to the negative input of amplifier 47 is one end of resistors 57, 51 and 52. The other end of resistor 57 is coupled to output node 48 to provide a feedback connection to the input of amplifier 47. The other end of resistor 51 is coupled to the power supply $V_{cc}$, while resistor 52 is coupled in series with ordinary n-channel transistor 53. The gate of transistor 53 is biased to establish a current flow through resistors 51 and 52. This makes the voltage provided at the negative input of amplifier 47 dependent upon the power supply voltage $V_{cc}$. By comparing this voltage to the reference provided at the positive input, the output provided at node 48 exhibits a relatively linear dependence on power supply.

Similarly, section 60 of FIG. 5 generates a voltage at node 55 which is linearly dependent upon temperature. Section 60 comprises operational amplifier 63 which is configured in a similar manner to that of the reference circuit of section 40. That is, the output of amplifier 63 produces a voltage at node 64 which is coupled back into the positive and negative inputs of amplifier 63 through resistors 65 and 66, respectively. Field-effect device 68 establishes current flow through resistors 66 and 67 and field-effect device 69 established current through resistor 65. However, unlike resistors 41 and 42 of the circuit of section 40, resistors 66 and 65 are selected to have different values. (In the currently preferred embodiment a 2 to 1 resistor ratio is utilized.) By making resistors 66 and 65 different in value, the output of amplifier 63 varies as a function of temperature. This output voltage which appears at node 64 is then level shifted by resistors 61 and 62 before being input into the positive input node of amplifier 70.

Amplifier 70 operates as a simple voltage follower to provide a high output impedance. The output of amplifier 70 is coupled to the negative input of operational amplifier 56, which is configured as a gain stage utilizing resistors 54 and 58. Once again, the positive input of amplifier 56 is coupled to the reference voltage line 46 so that the output voltage appearing in node 55 exhibits a linear dependence on temperature.

It should be understood, of course, that the foregoing disclosure relates only to one particular embodiment of the present invention and that numerous modifications may be made without departing from the nature and scope of the present invention. It should also be understood that the terms and expressions which have been employed here are used as terms of description and not of limitation, and there is no intention, of the use of such terms and expressions, of excluding equivalents of the features shown and described, or portions thereof; it being recognized that various modification are possible within the scope of the invention claimed.

I claim:

1. In an analog associative network which includes a plurality of synapse cells providing a weighted connection between a plurality of inputs and a plurality of neural summing devices, said neural summing devices generating a sum-of-products of said inputs and the weights stored within said synapse cells, an improvement for reducing the sensitivity of said network to temperature and power supply variations comprising:

a first circuit means for generating a first compensating signal input along a first input line coupled to said network, said first signal exhibiting a dependence on temperature which corresponds to said temperature variation; and means for setting the weights associated with the synapse cells coupling said first input line to said neural summing devices such that the sensitivity of said network to said temperature variation is reduced by the product of said first signal and said first weight.

2. The improvement of claim 1 further comprising a method for the setting of said weights which comprises the steps of:

applying an input pattern to said network, said patterning including predetermined power supply voltage and temperature components;

repeatedly applying said pattern to said network, but each time varying said predetermined power supply and temperature components such that said network is trained to recognize that temperature and power supply are not distinguishing features of said pattern.

3. In an analog associative network which includes a plurality of synapse cells providing a weighted connection between a plurality of inputs and a plurality of neural summing devices, said neural summing devices generating a sum-of-products of said inputs and the weights stored within said synapse cells, an improvement for reducing the sensitivity of said network to temperature and power supply variations comprising:

a first circuit means for generating a first compensating signal input along a first input line coupled to said network, said first signal exhibiting a dependence on a power supply which corresponds to said power supply variation; and means for setting the weights associated with the synapse cells coupling said first input line to said neural summing devices such that the sensitivity of said network to said temperature variation is reduced by the product of said first signal and said first weight.

4. The improvement of claim 3 further comprising:

a second circuit means for generating a second compensating signal input along a second input line coupled to said network, said second signal exhibiting a dependence on temperature which corresponds to said temperature variation; and a means for setting the weights associated with the synapse cells coupling said second input line to said neural summing devices such that sensitivity of said network to said temperature variations is reduced.

5. The improvement of claim 4 wherein said first circuit means and said second circuit means are fabricated on the same silicon substrate.

6. The improvement of claim 5 further comprising a method for the setting of said weights which comprises the steps of:

applying an input pattern to said network, said patterning including predetermined power supply voltage and temperature components;

repeatedly applying said pattern to said network, but each time varying said predetermined power supply and temperature components such that said network is trained to recognize that temperature and power supply are not distinguishing features of said pattern.

7. In an analog neural network capable of calculating the sum-of-products of an input pattern and a stored weight, said pattern being applied to a plurality of input voltage lines coupled to a plurality of output summing lines through a plurality of synapse cells, said synapse cells collectively storing said weight, and wherein said output summing lines are coupled to a corresponding plurality of neural summing devices for calculating said sum-of-products, a method of reducing the sensitivity of said network to temperature and power supply variations comprising the steps of:

generating a first signal which exhibits a temperature dependence corresponding to said temperature variation;

generating a second signal which exhibits a power supply dependence corresponding to said power supply variation;

setting a predetermined weight in the synapse cells associated with a first and a second input voltage line selected from said plurality of input voltage lines, said predetermined weight being related to said temperature and power supply dependence such that when said first signal is applied to said first input voltage line a first sum-of-product term is produced which counteracts said temperature variation, and when said second signal is applied to said second input voltage line a second sum-of-product term is produced which counteracts said power supply variation; and applying said first and second signals to said network along said first and second input voltage lines, respectively, as components of said pattern.

8. The method of claim 7 further comprising the step utilizing a learning algorithm to train said network to recognize that temperature and power supply are not distinguishing features of said pattern.

9. The method according to claim 8 wherein said utilizing step comprises the step of repeatedly applying said pattern to said network, but each time varying the power supply voltage and temperature.

10. In an analog associative network including a plurality of input voltage lines for receiving an input pattern comprising inputs $u_1$-$u_i$; a plurality of synapse cells providing a weighted connection between said input voltage lines and j neural summing devices, each of said cells storing a weight $W_{ij}$ such that neural summing devices collectively produce an output approximately equal to the equation:

$$\text{Sigmoid}(\Sigma u_i W_{ij} + \alpha T \Sigma u_i W_{ij} + \beta(PS)\Sigma u_i W_{ij})$$

where the terms $\alpha T \Sigma u_i W_{ij}$ and $\beta(PS) \Sigma u_i W_{ij}$ represent the sensitivity of said network to temperature (T) and power supply (PS) variations;

an improvement for reducing said sensitivity comprising:

a first circuit means for generating an input $u_T$ applied along one of said input lines;

a second circuit means for generating an input $u_{PS}$ applied to said network along another of said input lines;

a means for storing weights $W_T$ and $W_{PS}$ in the synapse cells associated with said one and said another of said input lines, respectively, such that the product $u_T W_T$ is approximately equal to $-\alpha T \Sigma u_i W_{ij}$ and the product $u_{PS} W_{PS}$ is approximately equal to $-\beta(PS)\Sigma u_i W_{ij}$, thereby effectively nullifying said temperature and power supply variations.

* * * * *